United States Patent

Weber

[15] 3,670,406

[45] June 20, 1972

[54] METHOD OF ADJUSTING INDUCTIVE DEVICES

[72] Inventor: Roger L. Weber, Richardson, Tex.

[73] Assignee: Texas Instruments Incorporated, Dallas, Tex.

[22] Filed: Feb. 4, 1970

[21] Appl. No.: 12,510

Related U.S. Application Data

[62] Division of Ser. No. 671,697, Sept. 29, 1967, Pat. No. 3,548,492.

[52] U.S. Cl. ................................29/593, 29/602, 324/57 Q, 324/59, 331/12, 334/28, 334/74

[51] Int. Cl. ................................G01r, G05f, H01h

[58] Field of Search ..................29/602, 593; 334/26, 27, 28, 334/70, 71, 74, 75, 76; 324/57 Q, 59 L, 59, 81; 331/9, 12

[56] References Cited

UNITED STATES PATENTS

| | | | |
|---|---|---|---|
| 3,405,365 | 10/1968 | Kobayashi | 334/26 |
| 3,409,841 | 11/1968 | Munn | 331/44 |
| 2,245,373 | 6/1941 | Weis et al. | 336/233 |
| 2,843,747 | 7/1958 | Ashley | 334/27 |
| 3,484,707 | 12/1969 | Iwahara | 334/26 X |

*Primary Examiner*—John F. Campbell
*Assistant Examiner*—Carl E. Hall
*Attorney*—Samuel M. Mims, Jr., James O. Dixon, Andrew M. Hassell, Harold Levine, Melvin Sharp, Gerald B. Epstein, John E. Van Digriff and James C. Falls

[57] ABSTRACT

Disclosed is a method of using a flow of abrasive-filled air to adjust an inductive device having a solid core by removing a portion of the core. The dimensions of the resulting air gap thus determine the final value of the device. The inductive device is adjusted after being connected in a circuit to provide the desired frequency response characteristic of the circuit by comparing the actual voltage amplitudes of selected frequency pairs with the desired voltage amplitudes of the same frequency pairs.

5 Claims, 8 Drawing Figures

METHOD OF ADJUSTING INDUCTIVE DEVICES

This application is a division of application Ser. No. 671,697, filed Sept. 29, 1967, now U.S. Letters Pat. No. 3,548,492, issued Dec. 22, 1970.

This invention relates to inductive devices and more particularly to miniature inductive devices of toroidal configuration.

After an inductive device has been formed by winding a helical wire conductor around a magnetic core, the value of the device is generally changed by physically adjusting the wire conductor to decrease or increase the number of turns by changing the position of the core relative to the conductor, the latter method being only available in the case of an in-line inductive device. With very small inductive devices, or those with deposited or etched conductors, either method is normally impractical after the device has been fabricated, and usually results in the use of a device which does not have exactly the desired value. When tuneable elements are placed in a circuit before adjustment, the tunable elements are adjusted until a desired frequency response characteristic is obtained. The method commonly used is to compare visually the actual frequency response characteristic of the circuit to the desired characteristic while adjusting the tunable elements until the desired characteristic is obtained. This visual method is time consuming and dependent upon the expertise of the person doing the visual comparison.

In brief, the invention involves a method of adjusting to value a toroidal inductive device having a magnetic core, such as an inductor or a transformer, either before or after its connection in a circuit, by removing a portion of the core to form an air gap, the dimension of the air gap determining the final value of the device. By allowing the adjustment of the device after its insertion in a circuit, the device can be adjusted to more nearly give the exact circuit performance desired. After the insertion of unadjusted tuning elements in a circuit, the circuit is adjusted to provide a desired frequency response characteristic by adjusting the tuning elements individually until the actual output amplitudes of selected frequency pairs are within allowable tolerance limits to the desired output amplitudes of the same frequency pairs.

Accordingly, an object of the invention is a method of adjusting a toroidal inductive device either before or after its insertion in a circuit without having to adjust the core position relative to the conductor or having to change the number of turns of the conductor.

Another object of the invention is to adjust a circuit containing adjustable tuning elements such as inductors and capacitors to furnish a desired frequency response characteristic without using a visual method of comparison with the actual frequency response characteristic.

The novel features believed to be characteristic of the invention are set forth with particularity in the appended claims. The invention itself, however, as well as further objects and advantages thereof may be best understood by reference to the following detailed description when read in conjunction with the accompanying drawings wherein:

FIG. 1 is a pictorial view of a toroidal inductor, illustrating the formation of an air gap by the use of a flow of abrasive-filled air;

FIG. 2*a* is a pictorial view of a toroidal transformer with two conductors which are mechanically separated and electrically isolated from each other and with minimum magnetic coupling between the two conductors;

FIG. 2*b* is a pictorial view of the toroidal transformer as illustrated in FIG. 2*a* after a minimum air gap has been formed resulting in an increased magnetic coupling between the two conductors;

FIG. 2*c* is a pictorial view of the toroidal transformer as illustrated in FIG. 2*a* after a maximum air gap has been formed resulting in maximum magnetic coupling between the two conductors:

Figures 4, 5A, 5B:
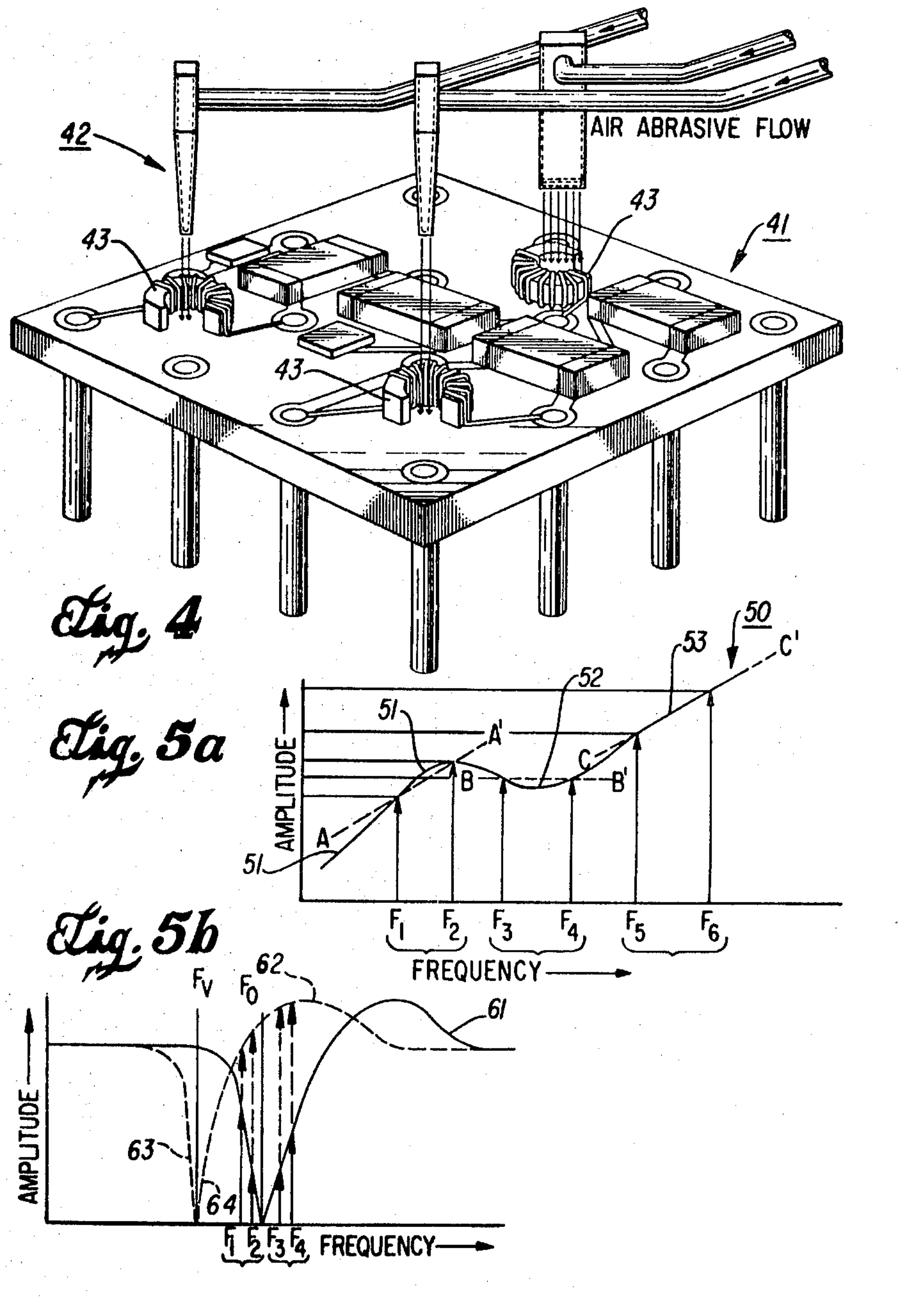
FIG. 4 is a pictorial view of a number of toroidal cores being adjusted to value simultaneously after being connected to a printed circuit board.

FIGS. 5*a* and 5*b* are representations of the frequency pair method of obtaining a desired frequency response characteristic from each of two circuits containing adjustable tuning elements.

Figures 1, 2A, 2B, 2C, 3:
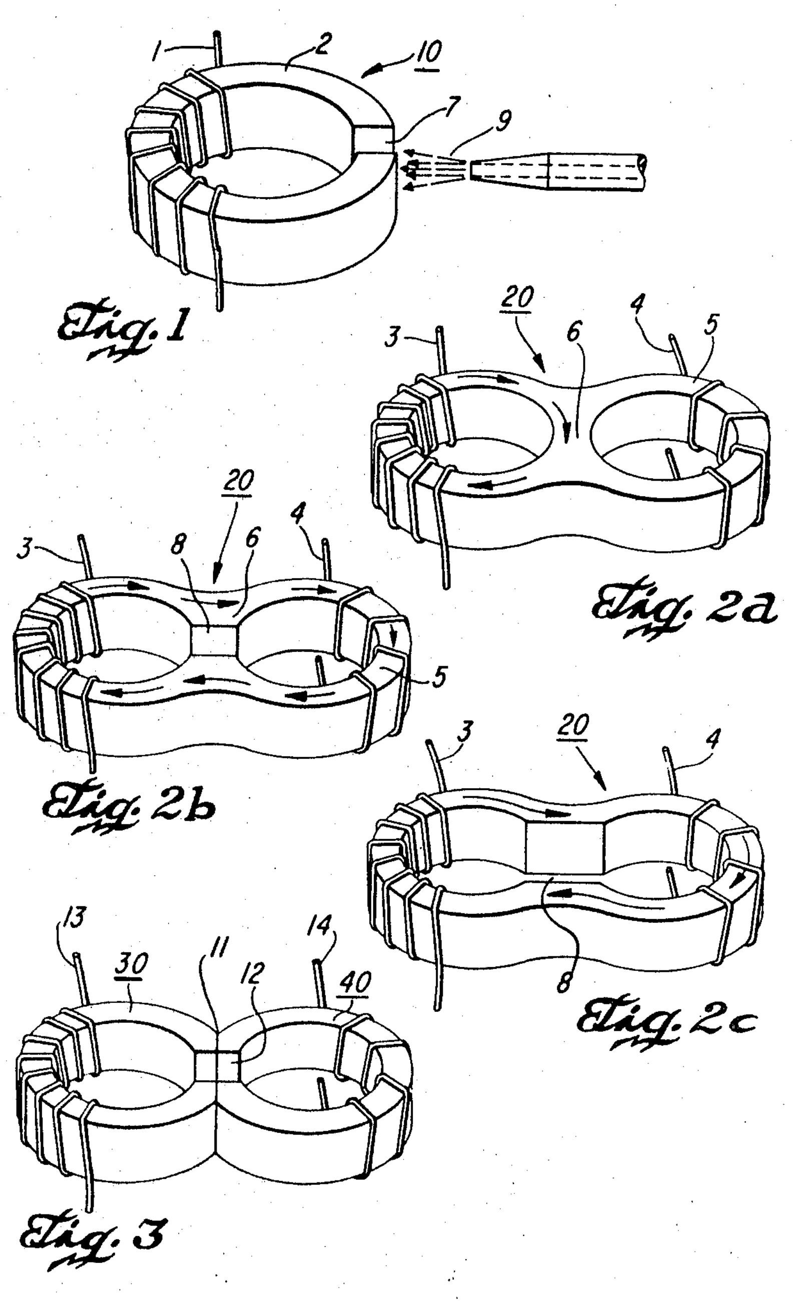
FIG. 3 is a pictorial view of two separate toroidal inductors that have been connected to form a transformer with an air gap formed in the connecting portion.

Referring now to the figures of the drawings, a toroidal inductor or coil, generally indicated by the numeral 10, is shown in FIG. 1 having a conductor 1 wound around a portion of a toroidal ferrite or iron core 2, for example. The conductor 1 is generally an insulated wire or a continuous strip of metal either formed from a layer of metal deposited on the core 2 or deposited on the core in the form of a continuous strip, for example. The inductance of the inductor 10 is determined by the size and magnetic characteristics of the core 2 and the number of turns of the conductor 1 on the core 2. In the case of an inductor used in miniature electronic circuits, the core 2 may have an outside diameter of only about 100 mils and an inside diameter of about 60 mils. The conductor 1, usually of copper, may be only about 4 mils in thickness. The extremely small size of the inductor 10 makes it difficult to control the inductance by the number of windings of the conductor and the size of the core 2 and thus obtained the exact inductance desired. The toroidal inductor 10 is fabricated with an inductance that is slightly higher than the final inductance desired by the design of the inductor as previously explained. The inductance is lowered to the exact inductance desired either before or after the insertion of the inductor in a circuit, whichever is most practical in a given situation. In circuits where the desired value of the inductor is not known until the operation of the inductor in the circuit, there is a very decided advantage in adjusting the inductor to the desired value after its connection in the circuit.

In the case where the inductor 10 is to be adjusted prior to its connection in a circuit, the ends of the conductor 1 are connected to a conventional inductance measuring instrument. An abrasive-filled air flow 9 is supplied by any convenient apparatus. One widely used piece of equipment, for example, is manufactured by S. S. White, Long Island, N.Y. A flow of air containing particles of an abrasive material such as aluminum oxide, for example, is directed at the side of the core opposite the side of the core on which the conductor 1 is wound until sufficient core material is removed to form an air gap 7. The abrasive particles wear away the core material until the air-abrasive blast removes the desired amount of material from the core. An air gap or cut as small as 0.002 inch in width can be formed in the core in this manner. The air gap is then widened by further air-abrasive blasting until the inductance is decreased to the desired value. When the desired inductance is reached, the air flow is terminated either manually or electrically by a servo-system connected between the inductance measuring instrument and the air-abrasive unit. In circuits where the exact inductance desired cannot be determined until the connection of the inductor 10 in the circuit, the air-abrasive blasting procedure, as previously explained, can be accomplished after the inductor is wired into the circuit using certain circuit performance characteristics as an indication of when the desired inductance is obtained. A bifilar transformer having a second insulated conductor (not shown) wound on the core 2 in the same relative position as conductor 1 is adjusted in the same manner as the inductor 10. The inductance of both conductors (primary and secondary windings) are increased simultaneously by the formation of the air gap 7 which causes a change in the mutual inductance of the bifilar transformer.

In FIG. 2*a*, a transformer in the form of a double toroid is indicated generally by the numeral 20. The transformer 20 has conductors 3 and 4, either wires or strips of metal, wound around separate openings formed in the core material 5. The conductors 3 and 4 are not only mechanically separated from each other, but also electrically and to some degree magnetically isolated as well. The flux lines, indicated by arrows, generated by a voltage (source not shown) placed across the terminals of the conductor 3 complete their path by the use of the central part 6 of the core. Therefore, there is little or no magnetic coupling between the conductors 3 and 4 at this stage of fabrication.

To magnetically couple the conductors 3 and 4, an air gap 8 is cut with a flow of abrasive-filled air, as explained in conjunction with FIG. 1, in the central part 6 of the core 5, as shown in FIG. 2*b*. The air gap 8 introduces a high reluctance flux path through the central part 6, and as a consequence, a percentage of the flux lines will now follow a path through the part of the core on which the conductor 4 is wound, causing a current to be induced in the conductor 4.

The amount of coupling between conductors 3 and 4, and, therefore, the amount of induced current in conductor 4 due to an alternating current in conductor 3 is determined by the ratio of the reluctance of the flux path through the center part 6 of the core to the flux path through the part of the core on which the conductor 4 is wound, which ratio is determined mainly by the width of the air gap 8.

In FIG. 2*c*, the transformer 20 has had its center part 6 cut almost completely away, thereby leaving an air gap 8 of maximum width, thus allowing maximum coupling between the conductors 3 and 4. The amount of coupling therefore can be varied by cutting the air gap 8 with a small width as shown in FIG. 2*b* which allows minimum coupling and a very small induced current in conductor 4, to the maximum width air gap as shown in FIG. 2*c*, which allows maximum coupling and the greatest possible current induced in conductor 4.

Instead of using a single core in the forming of a transformer as shown in FIGS. 2*a*–2*c*, two inductors indicated generally by the numerals 30 and 40, both having a flat side 11 are placed in juxtaposition to each other at the flat portion 11 to form a transformer. The air gap 12 is formed by a flow of abrasive-filled air, as was explained in conjunction with FIGS. 2*a*–2*c*, to magnetically couple the conductor 13 to the conductor 14.

One example of the multiple adjustment of a number of toroidal inductors after their connection in a circuit is shown in FIG. 4. Multiple adjustment can also be accomplished prior to circuit connection by the use of appropriate test fixtures. In the fabrication of the miniature module circuit shown in FIG. 4, the toroidal inductors 43 are connected to the circuit prior to their adjustment. The circuit 41 is located beneath an array 42 of air-abrasive nozzles with each nozzle positioned in relationship to a corresponding toroidal inductor 43. One method of adjusting the inductors 43 is to electrically connect each inductor to the the servo-system (not shown) of its corresponding air-abrasive nozzle through a measuring device such that although all of the air-abrasive nozzles may begin to operate at the same time, the servo-system connected between an inductor and its corresponding nozzle will shut off that nozzle independently of the other nozzles when the inductor reaches the predetermined value set into the measuring device.

Instead of the usual method of determining the correct adjustment of a circuit to give a desired output by visually comparing a representation of the actual frequency response characteristic with the desired frequency response characteristic of the circuit, the preferred method of the invention utilizes a two-frequency or frequency-pair method which can be automated by the use of a computer, if desired, and thus eliminate the slower visual comparison method used in the past.

The curve 50 in FIG. 5*a* is a representation of the frequency response characteristic of a circuit driven by a constant amplitude sweep-frequency generator. The pairs of test frequencies, $F_1$–$F_2$, $F_3$–$F_4$ and $F_5$–$F_6$ correspond to input examining frequencies which have been predetermined to correspond to critical points on the curve 50, the location and spacing between the two frequencies of a pair being determined by the critical inflection portions (change of signs of the slopes) of the curve 50. An output amplitude measurement at $F_1$ (indicated by the arrow above $F_1$) yields a smaller output voltage than one made at $F_2$ (indicated by the arrow above $F_2$). The relative amplitudes of the two frequencies of the $F_1$–$F_2$ pair indicate that the actual slope of the curve, line A—A′, over the particular portion 51 of the curve between the two frequencies, is positive (+). This information is then examined, by computer, manually or by other means, and compared to a predetermined value. If the relative amplitudes are within acceptable tolerance limits, no adjustment to the circuit needs to be made involving the portion 51 of the curve. If the portion 51 of the curve is not within acceptable tolerance limits, the part of the circuit containing inductive and/or capacitve tuning elements that effect the portion 51 of the curve is adjusted by changing the value of the tuning element. The preferred method of adjustment of the circuit is accomplished by the air-abrasive technique described in conjunction with FIG. 4 except that only one tuning element, either capacitor or inductor is adjusted at one time. Another tunable part of the circuit is adjusted as previously described until the next frequency pair $F_3$–$F_4$ have the same amplitudes as indicated by the dotted line B—B′, thereby causing the portion 52 of the curve 50 to conform to the desired shape. When the equal amplitudes of $F_3$ and $F_4$ are reached, the rather broad portion 52 of the curve is centered within allowable limits between the frequencies $F_3$ and $F_4$. The desired slope C— C′ of the portion 53 of the curve is obtained by adjusting the proper tuning elements until the slope between $F_5F_6$ is positive and the amplitudes of $F_5$ and $F_6$ (the amplitude of $F_6$ being greater than the amplitude of $F_5$) are of the desired value, thereby furnishing the desired slope.

A representation of the frequency-response characteristic of a band-stop circuit having maximum attenuation at $F_o$ is shown in FIG. 5*b*. The desired output response is indicated by the curve 61 having a desired high attenuation frequency $F_0$. The curve 62 indicates the shape of the circuit response before any adjustments have been made to the frequency selective or tuning elements. The tuning elements are adjusted until such time as the slope of the portion 63 of the curve 62 between $F_1$ and $F_2$ becomes negative (−) with the amplitude at $F_2$ equaling the amplitude at $F_3$ and further that the slope of the portion 64 of the curve 62 between $F_3$–$F_4$ becomes positive (+). When the required conditions are satisfied, $F_r$ of curve 62 will be coincident with $F_o$ of curve 61 and no further adjustment to the circuit is made, since the desired conditions are met, the slope between $F_1$–$F_2$ being negative, the slope between $F_3$–$F_4$ being positive and the amplitude at $F_2$ equaling the amplitude at $F_3$. The relative position of the frequency pairs $F_1$–$F_2$ and $F_3$–$F_4$ and the degree of separation between the two frequencies of a pair are selected according to the curve desired.

A band-pass circuit having maximum response at a given frequency $F_o$ instead of the given band-stop circuit having maximum attenuation can be adjusted in like manner, the signs of the slopes of different portions of the curve being reversed.

The need for viewing a representation of the frequency response characteristic is thus eliminated. All that is required to use the method of the invention is the comparison of the actual amplitudes of the predetermined frequencies with the desired amplitudes of these frequencies. This comparison method does not require a visual representation of the output but can be accomplished by a computer, for example. Thus, the method is easily adapted to the combination of a computer, servo-system and tuning element system, such as the previously described use of air-abrasive techniques, to adjust a circuit automatically with a tremendous decrease in circuit adjustment time. Although the air-abrasive tuning technique, as explained in conjunction with FIG. 4, is ideally suited for the frequency-pair comparison method, any of the common methods of adjusting a circuit can be used.

Although preferred embodiments of the invention have been described in detail, it is to be understood that various changes, substitutions, and alterations can be made therein without departing from the spirit and scope of the invention as defined by the appended claims.

What is claimed is:

1. A frequency-pair method of adjusting a tunable circuit containing tunable circuit elements to produce an actual frequency response characteristic conforming to a desired frequency response characteristic, comprising the steps of:

a. analyzing said desired frequency response characteristic of said tunable circuit and determining the critical inflection portions thereof;

b. establishing pairs of test frequencies which selectively correspond to critical points on said desired frequency response characteristic, each pair of test frequencies being selected so as to have a location and frequency difference with respect to their respective critical inflection portion of said desired frequency response characteristic wherein their relative output amplitudes represent the actual slope of their respective critical inflection portion of said desired frequency response characteristic;

c. sequentially examining and comparing the actual relative output amplitudes of each of said frequency-pairs with the desired slope of the respective critical inflection portion of said desired frequency response characteristic;

d. sequentially determining whether the actual relative output amplitude of each of said frequency-pairs is within predetermined tolerance limits; and e. sequentially adjusting selected tunable elements of said tunable circuit until the actual relative output amplitude of each of said frequency-pairs is within predetermined tolerance limits with respect to the desired slope of the respective critical inflection portion of said desired frequency response characteristic.

2. The method of claim 1 wherein said tunable elements are miniature inductive devices.

3. The method of claim 1 wherein said tunable elements are miniature toroidal transformers.

4. The method of claim 1 wherein said tunable elements are miniature bifilar toroidal transformers.

5. The method of claim 1 wherein said tunable elements are miniature inductive devices having at least one conductor wound around at least a portion of a magnetic core and are adjusted by positioning a source of abrasive filled air so that the flow of abrasive filled air therefrom impinges upon a preselected portion of said magnetic core for a period of time sufficient to selectively remove a portion thereof to produce at least a partial air gap therein having a geometrical dimension with respect to said magnetic core that produces a desired electrical value.

* * * * *